United States Patent
Selvaggi et al.

(10) Patent No.: US 8,255,665 B2
(45) Date of Patent: *Aug. 28, 2012

(54) SIMD PROCESSOR WITH REGISTER ADDRESSING, BUFFER STALL AND METHODS

(75) Inventors: Richard J. Selvaggi, Doylestown, PA (US); Larry A. Pearlstein, Newtown, PA (US)

(73) Assignee: Broadcom Corporation, Irvine, CA (US)

( * ) Notice: Subject to any disclaimer, the term of this patent is extended or adjusted under 35 U.S.C. 154(b) by 932 days.

This patent is subject to a terminal disclaimer.

(21) Appl. No.: 12/231,336

(22) Filed: Aug. 29, 2008

(65) Prior Publication Data

US 2009/0125702 A1    May 14, 2009

Related U.S. Application Data

(63) Continuation of application No. 10/929,992, filed on Aug. 30, 2004, now Pat. No. 7,434,024.

(51) Int. Cl.
  *G06F 12/00* (2006.01)
  *G06F 13/00* (2006.01)
(52) U.S. Cl. ......... 711/203; 711/100; 711/154; 711/200

(58) Field of Classification Search .................. 711/100, 711/154, 200, 203
See application file for complete search history.

(56) References Cited

U.S. PATENT DOCUMENTS

| 7,216,217 B2 * | 5/2007 | Hansen et al. ................ 712/221 |
| 2005/0089238 A1 * | 4/2005 | Fogg et al. .................... 382/246 |

OTHER PUBLICATIONS

Analog Devices, Inc., "ADSP-TS101 TigerSHARC Processor Hardware Reference", Revision 1.1, May 2004, Part No. 82-001996-01, 1-1-2-48.*

* cited by examiner

*Primary Examiner* — Tuan V. Thai
(74) *Attorney, Agent, or Firm* — Thomas, Kayden, Horstemeyer & Risley LLP.

(57) ABSTRACT

A single instruction, multiple data (SIMD) processor including a plurality of addressing register sets, used to flexibly calculate effective operand source and destination memory addresses is disclosed. Two or more address generators calculate effective addresses using the register sets. Each register set includes a pointer register, and a scale register. An address generator forms effective addresses from a selected register set's pointer register and scale register; and an offset. For example, the effective memory address may be formed by multiplying the scale value by an offset value and summing the pointer and the scale value multiplied by the offset value.

45 Claims, 5 Drawing Sheets

SIMD PROCESSOR WITH REGISTER ADDRESSING, BUFFER STALL AND METHODS

This application is a continuation of U.S. patent application Ser. No. 10/929,992 filed on Aug. 30, 2004, having as inventors Selvaggi, et al. and entitled "SIMD Processor and Addressing Method".

FIELD OF THE INVENTION

The present invention relates generally to microprocessors and more particularly to memory addressing techniques used by microprocessors. The invention is particularly suitable for use in single instruction, multiple data (SIMD) processors.

BACKGROUND OF THE INVENTION

SIMD processors are best suited to performing the same operation on multiple pieces of data simultaneously. Any processor clock cycles not spent performing data processing operations are underutilizing the processing resources of such a costly parallel processor. Typical types of memory addressing require a conventional SIMD processor to spend clock cycles on address calculations and data formatting.

For example, SIMD processors typically only access (i.e., read or write) data within memory, on memory unit boundaries (e.g., byte, 16-bit word, 32-bit word, or 128-bit word). Any need to access data in less than the conventional data unit size, or on boundaries that are not aligned with memory unit boundaries typically require manipulation of data to access the unaligned data. Although this can often be accomplished using conventional data manipulation techniques (byte shifts, AND-masking, etc.), such manipulation requires processor resources.

Similarly, SIMD processors often need to access data at uniformly spaced addresses. For example, often data needs to be accessed in columns of a matrix. Again, calculation of subsequent addresses requires the use of processor resources.

Accordingly, there is a need for a SIMD processor that is capable of flexibly addressing memory while using limited processor resources.

SUMMARY OF THE INVENTION

In accordance with an aspect of the present invention, a processor includes a plurality of addressing register sets, used to flexibly calculate effective operand source and destination memory addresses. Two or more address generators calculate effective addresses using the register sets.

Each register set includes a pointer register, and a scale register. An address generator forms effective addresses from a selected register set's pointer register and scale register; and an offset. For example, the effective memory address may be formed by multiplying the scale value by an offset value and summing the pointer and the scale value multiplied by said offset value.

Conveniently, use of multiple register sets and address generators allow for the flexible formation of operand and destination addresses, without unduly consuming processor resources.

In accordance with another aspect of the present invention, a SIMD processor includes a memory interface for accessing memory addressable in data units of a defined bit size, on non-conventional data unit boundaries. The memory interface includes an address generator for generating first and second addresses of memory to be read on conventional boundaries; a memory interconnect to obtain data units at said first address having said defined bit size, and at said second address having said defined bit size; and a combiner for combining said data units from said first and second memory addresses to form an operand spanning said first and second memory addresses.

In accordance with yet another aspect of the present invention, a processor allows access to a first in first-out buffer (FIFO) within memory and includes an interlock. The interlock stalls the processor when the processor attempts to read from addresses of the FIFO not yet written to by an external device, or when the processor attempts to write to portions of the FIFO not yet read by an external device.

In accordance with still another aspect of the present invention, there is provided a method of executing an instruction using a processor, the processor having a plurality of addressing register sets, each register set including a pointer register and a scale register, the method including calculating an effective memory address for use by the processor in executing the instruction, the calculating including: determining a selected one of the register sets from the processor instruction; retrieving a pointer stored in the pointer register of the selected one of the register sets; retrieving a scale value stored in the scale register of the selected one of the register sets; forming an effective memory address from the scale value, the offset value and the pointer.

In accordance with yet another aspect of the present invention, there is provided a processor having at least two register sets, each of the register sets including a pointer register containing a memory address and an associated increment register, a method of executing an instruction including: retrieving data stored at a memory address based on a pointer register of a first one of the sets, for use as a first operand. It also includes a method of performing an arithmetic or logical operation in accordance with the instruction on the first operand to produce a result, and a method of updating the pointer register of the first set by incrementing the pointer register of the first set based on a value contained in its associated increment register.

In accordance with still another aspect of the present invention, there is provided a processor for connection with processor-readable memory, the processor including: first and second address generators for generating first and second operand memory addresses, respectively; first and second sets of registers, in communication with the first and second address generators, each of the first and second set of registers including a pointer register and a scale factor register; the first operand memory address generated by summing values in the scale register of the first set of registers multiplied by a first offset value and the pointer register of the first set of registers; the second operand memory addresses generated as summing values in the scale register of the second set of registers multiplied by a second offset value and the pointer register of the second set of registers; There is also provided an arithmetic logic unit in communication with memory for performing an arithmetic or logical operation specified by an instruction, on operands stored at the first and second operand memory addresses of the processor readable memory.

In accordance with yet another aspect of the present invention, there is provided a single instruction, multiple data (SIMD) processor including a memory interface for accessing memory addressable in data units of a defined bit size, the memory interface including: an address generator for generating first and second addresses of memory to be read; a memory interconnect to obtain data units at the first address having the defined bit size, and at the second address having the defined bit size. There is also provided a combiner for combining the data units from the first and second memory addresses to form an operand spanning the first and second memory addresses.

In accordance with still another aspect of the present invention, there is provided a processing system including a processor and memory, wherein the memory is addressable by the processor in memory data units having a defined bit size, a method of retrieving a source data unit spanning first and second ones of the memory data units, the method including: simultaneously addressing the memory to access the first and second ones of the memory data units; retrieving data stored in the first and second ones of the memory data units; and combining the data stored in the first and second memory data units to form the source data unit.

In accordance with yet another aspect of the present invention, there is provided a processing system including a single instruction, multiple data (SIMD) processor and memory, wherein the memory is addressable by the processor in memory data units having a defined bit size, a method of storing a resulting data unit spanning first and second ones of the memory data units, the method including: splitting the resulting data unit into first and second data portions; the first data portion to be stored in the first of the memory data units; the second data portion to be stored in the second memory data units; and generating a first masking instruction to cause a memory element storing the first data unit to mask writing to the data unit at bits not occupied by the first data portion; The method also includes generating a second masking instruction to cause a memory element storing the second data unit to mask writing to the data unit at bits not occupied by the second data portion; providing the first and second masking instructions to memory storing the first and second data units; and storing the first data portion into the portion of the first memory data unit according to the first masking instruction and concurrently storing the second data portion at a portion of the second memory data unit according to the second masking instruction.

In accordance with still another aspect of the present invention, there is provided a method of operating a processor executing sequential instructions, including: receiving a stream of data; buffering a portion of the stream, in a first-in, first-out buffer within memory of the processor; reading data from the first-in-first out buffer, by the processor; encountering an instruction to read data in the stream not yet received in the buffer; stalling execution of the instruction and further ones of the sequential instructions until the data within the stream specified by the instruction has been received in the first-in, first-out buffer.

In accordance with yet another aspect of the present invention, there is provided a processor that executes instructions stored in instruction memory, the processor including: memory defining a first-in, first-out buffer for buffering a portion of a data stream, to be read in a stream by a device other than the processor; an arithmetic or logic unit, for processing data within the memory; an address generator for generating a memory address of the memory to be written to by the ALU; an interlock, operable to generate a halt signal to halt execution of a currently executing instruction in the instruction memory in response to the address generator generating an address to write to an address in the first-in, first-out buffer containing data, not yet read by the other device.

In accordance with yet another aspect of the present invention, there is provided a method of operating a processor executing sequential instructions, including: buffering a portion of a stream of data to be written, in a first-in, first-out buffer within memory of the processor; providing data from the first-in, first-out buffer to a device other than the processor; writing data to the first-in-first out buffer, by the processor; encountering an instruction to write data to the first-in, first out buffer at addresses containing data not yet provided from the first-in, first-out buffer; stalling execution of the instruction and further ones of the sequential instructions until the data within the first-in, first-out buffer specified by the instruction has been provided from the first-in, first-out buffer.

In accordance with still another aspect of the present invention, there is provided a computer-readable memory storing instructions for execution by a processor including a plurality of register sets, the memory storing a SIMD processor executable instruction including: a plurality of bits identifying an op code; a plurality of bits identifying a first one of the register sets used to form a memory address of a first operand; a plurality of bits identifying a second one of the register sets used to form a memory address of a second operand; a plurality of bits identifying a third one of the register sets used to calculate a destination address, for storing a result of the op code operating on the first and second operands.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
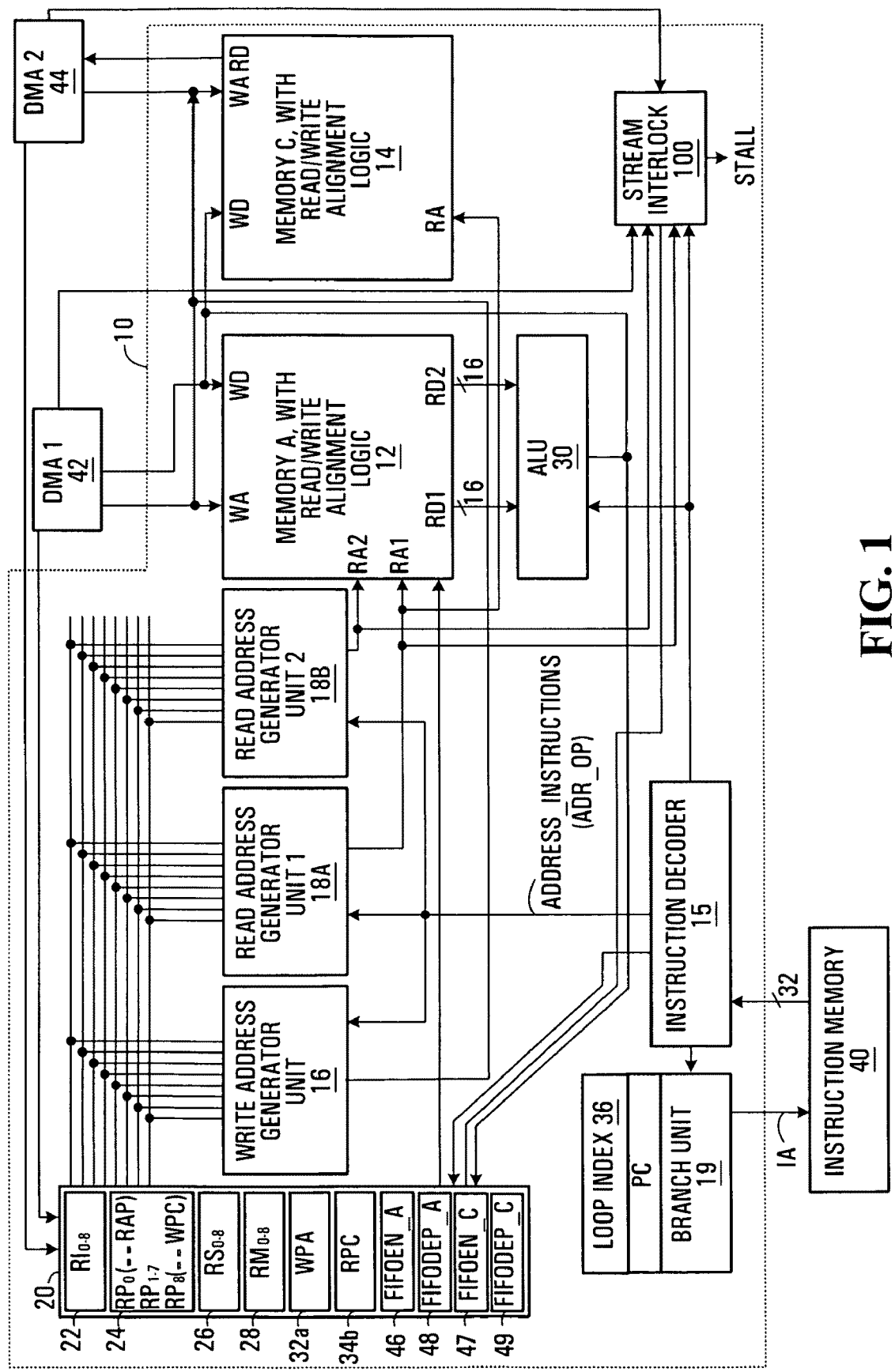
FIG. 1 is a simplified schematic block diagram of a processor exemplary of an embodiment of the present invention.

FIG. 1 illustrates an exemplary single instruction, multiple data (SIMD) processor 10, exemplary of an embodiment of the present invention. As illustrated, processor 10 includes internal memories A and C 12, 14; an instruction decoder 15; a branch unit 19; an arithmetic and logic unit (ALU) 30; a write address generator 16; two read address generators 18*a* and 18*b*; and a plurality of address registers 20.

Memory read addresses are provided to memory A 12 by way of sets of read address lines RA1 and RA2 driven by read address generator 18*a* and 18*b*, respectively. By contrast, memory write addresses are provided by write address lines WA driven by write address generator 16. Data is provided to memory A 12 by way of write data lines WD. Data to memory A 12 may also be provided by a direct memory access (DMA) engine 42, external to processor 10.

Memories A and C 12, 14 provide data to external devices through DMA engines 42, 44. Memory A 12 is written to by DMA engine 42, while memory C 14 may be read by DMA engine 44. Memory C 14 thus serves as a buffer memory for a direct memory access (DMA) engine 44. Notably, in the depicted embodiment, memory C 14 may only be written to by processor 10, and read from by DMA engine 44. Memory C 14 receives data from ALU 30 by way of write data lines WD; and a write address from write address generator 16 on write address lines WA.

In a streaming mode of operation, detailed below, DMA engine 42 provides write addresses to memory A 12 by way of a write address register. DMA engine 44 similarly provides read addresses to memory C 14 by way of a read address register. Conventional arbitration logic (not illustrated) may form part of DMA engines 42, 44 or memories A, C 12, 14 and ensures that read/write addresses from DMA engines 42, 44 or address generators 16, 18a, 18b are applied at any given instance in time. In another non-streaming mode of operation, DMA engines 42, 44 provide memory addresses directly to memories A and C 12, 14 to effect memory reads and writes.

Each of memory A and memory C 12, 14 include a plurality of memory units each having a 128-bit size. Conventionally, thus, memory A and C 12, 14 are accessible on 128-bit boundaries. Memories A and C 12, 14, however, include address alignment logic to allow access to memory on boundaries not aligned with the 128-bit boundaries of conventional data units of memories 12 and 14, in manners exemplary of embodiments of the present invention. For ease of illustration, each memory A and C 12, 14 in the depicted embodiment includes only 64 data units (32 at even memory addresses, 32 at odd memory addresses).

Register sets 20 include multiple types of addressing registers: increment registers 22 (referred to as $RI_x$); pointer registers 24 (referred to as $RP_x$); scale registers 26 ($RS_x$); mode registers 28 ($RM_x$); and read pointer register (memory A) RPA ($RP_0$) 24, and write pointer register (memory A) WPA 32a and read pointer register (memory C) RPC 32b and write pointer register (memory C) WPC ($RP_8$) 24. Four further control registers, FIFOEN_A, FIFODEP_A, FIFOEN_C, and FIFODEP_C 46, 48, 47 and 49 used for maintenance of first-in-first out buffers in memories A and C, are also depicted. Address registers 22, 24, 26, and 28 are organized in sets. One register set includes one increment register 22; one pointer register 24; one scale register 26; and one mode register 28. In the illustrated embodiment register sets 20 includes nine (9) register sets. Seven of these register sets $RI_{1-7}$; $RP_{1-7}$; $RS_{1-7}$; and $RM_{1-7}$ are general purpose register that may be used for reading and writing to memory A 12 or writing to memory C 14. The register sets $\{RI_0; RP_0$ ($RP_0$ is also referred to as RPA); $RS_0$ and $RM_0\}$; and $\{RI_8; RP_8$ ($RP_8$ is also referred to WPC); $RS_8$ and $RM_8\}$ are special purpose registers used for accessing memories A and C 14 and 16 in a streaming memory access mode, as detailed below. Write register WPA 32a accessible by DMA engine 42 is used to address memory A 12 for writes in streaming mode. Read register RPC 32b is used to provide read addresses for reads by ALU 30 in streaming mode. Read register RPC 32b, accessible by DMA engine 44, is used by DMA engine 44 to address memory C 14 for reads in streaming mode. WPC ($RP_8$) 24 is used by ALU 30 to write to memory C 14 in streaming mode.

Although largely a matter of design choice, in the depicted embodiments, scale and pointer registers 26, 24 are ten-bit registers; and increment registers 22 are three-bit registers. As will become apparent, ten-bit address registers allow addressing of the exemplary 64×128-bit memories A and C 12, 14 in eight-bit increments. FIFODEP_A and FIFODEP_C are three bit registers, while FIFOEN_A and FIFOEN_C is a one bit status register.

To allow simultaneous reading of data at two addresses of memory 12, two instances of memory A are provided. Only a single instance is illustrated in FIG. 1. Write address lines and data lines of the two instances are interconnected in parallel, thereby ensuring that the states of the two instances remain synchronized.

ALU 30 is a conventional SIMD arithmetic and logic unit. As such, ALU 30 includes a plurality of ALUs (not specifically illustrated) operating in parallel. Each of these ALUs operates in parallel to apply the same instruction to portions of the operands. An overview of SIMD ALU architecture may be found in John L. Hennessy, David A. Patterson, David Goldberg, Computer Architecture: A Quantitative Approach (Morgan Kaufmann, 2002)-ISBN: 1558605967, the contents of which are hereby incorporated by reference. ALU 30 operates on data at two memory locations within memory A 12 specified by address lines RA1 and RA2 and provided to ALU 30 by data lines RD1 and RD2, in response to instructions stored within external instruction memory 40. One or more clock cycles later, the results of an arithmetic or logical operation are presented on write data lines WD and written to memory A or C, 12 or 14 at the write address presented at write address lines WA.

A combinational logic block, identified as a stream interlock block 100 is interconnected with DMA engines 42 and 44, decoder 15 and WPA, RPA, WPC and RPC registers 32a, 24, 24, and 32b. As will become apparent, block 100 generates a stall signal to stall operation of execution of processor in the event areas of memory A and C 12, 14 are prematurely addressed.

Instruction memory 40 stores instructions for execution by processor 10. Instructions are decoded within instruction decoder 15. Instruction memory is depicted as external to processor 10. Of course, instruction memory 40 could form part of processor 10.

The address of a currently executed instruction within memory 40 is dictated by a program counter (PC) that is part of a branch unit 19. Branch unit 19 increments the associated program counter in accordance with the instruction requirements, in manners understood by those of ordinary skill. Branch unit 19 further includes a loop index register 36. In the disclosed embodiment, loop index register 36 is a ten-bit register.

Figure 2:
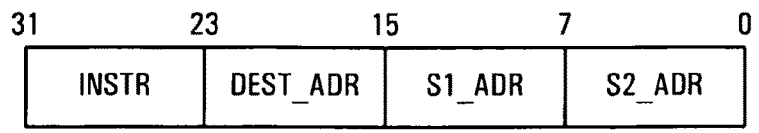
FIG. 2 illustrates the format of exemplary instructions executed by the processor of FIG. 1.

The format of one type of instruction stored in memory 40 executed by processor 10 is illustrated in FIG. 2. As illustrated, an example instruction has 32 bits organized in four eight-bit portions. Bits [31:24] of the instruction, identify the actual instruction or op-code to be executed; bits [23:16] identifies the register set storing destination addresses within memory A 12 (or memory C 14) into which the results of the executed instruction are to be stored; bits [15:8] and bits [7:0], respectively identify first and second operand register sets identifying memory read addresses within memory A 14 storing operands on which the instruction is to operate. More specifically, bits [6:4] identify one of eight register sets; bits [3:0] identify a four-bit displacement value and bit [7] identifies whether or not the pointer address should be incremented. As will be appreciated by persons of ordinary skill, processor 10 may additionally be capable of executing instructions having formats other than those illustrated in FIG. 2.

Additional instructions (not specifically illustrated) allow the loading of individual ones of registers 20; and allow for execution sequence control.

In any event, an instruction decoder 15 decodes a provided instruction to produce three addressing instructions (ADR_OP): two read addressing instructions and one write addressing instruction. Each addressing instruction has eight bits: bits [6:4] identify a register set for an operand; bits [3:0] identify a displacement value, detailed below; bit [7] identifies whether the pointer register (RP) 24 within a register set should be auto incremented by a value stored in the increment register 22 (RI) of the register set. Additionally, instruction decoder 15 provides a write size identifying the size of data to be written to memory, as a three bit signal identified as WSIZE[2:0]. The write size depends on the instruction (opcode) being executed, and is thus decoded at instruction decoder 15 based on the op-code of the current instruction. For example, one example add instruction could generate a 128-bit result from the 8-way parallel adds of two 16-bit operands; another add instruction may produce a 32-bit result summing 8, 16-bit operands, into a 32-bit result.

Figure 3:
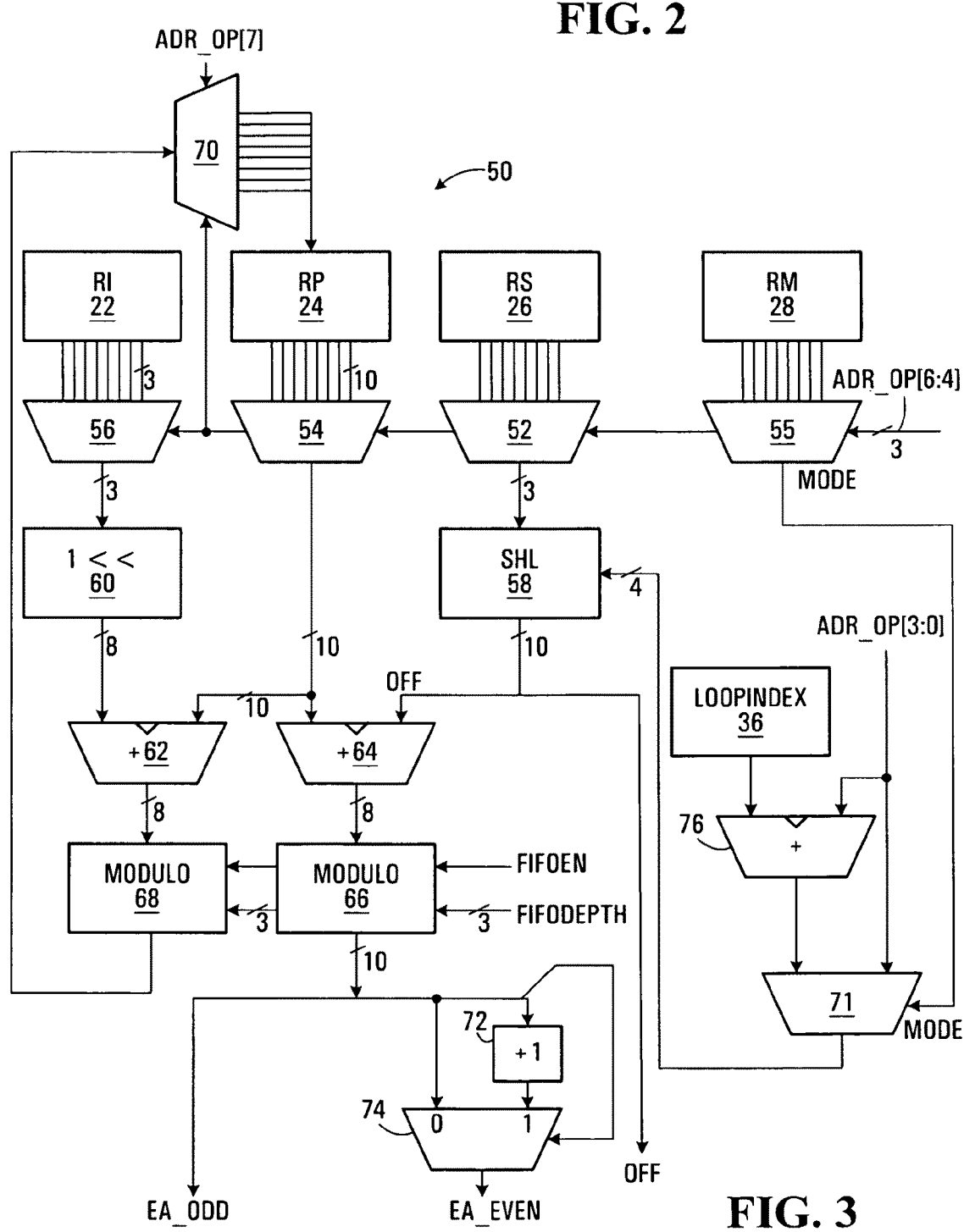
FIG. 3 is a simplified schematic block diagram of a memory address generator of the processor of FIG. 1.

Each of write address generator 16, and read address generators 18a and 18b may be formed of like address generators to calculate effective addresses (EAs) using register sets of registers 20. An exemplary address generator 50 which may be used as read address generator 18a or 18b or write address generator 16 is schematically illustrated in FIG. 3. As illustrated, address generator 50 includes selector 54 having a plurality (eight in the depicted embodiment) of sets of ten-bit inputs, each of which is interconnected to one of pointer registers (RP) 24. Address generator 50 further includes selector 52, also having a plurality (eight) of sets of three-bit inputs, each set of which is interconnected with one scale register (RS) 26. As well, address generator 50 further includes a selector 56 having a plurality (eight) of sets of three-bit inputs, each of which is interconnected with one of the plurality of increment registers (RI) 22. Selector 55 likewise includes eight sets of eight-bit inputs. Each set receives the value of one of the eight-bit mode registers (RM) 28. Each selector 52, 54, 55, 56 outputs a selected sets of its eight inputs. Selection of which input is controlled by interconnected data select lines of each data selectors 52, 54, 55, 56. The inputs to the data select lines of selectors 52, 54, 55, and 56 are provided by way of bits [6:4] of the addressing instruction (read or write, as the case may be) decoded by instruction decoder 15 from an instruction being executed. As such, increment, pointer, scale, and mode registers 22, 24, 26 and 28 are selected in sets with the select lines selecting the address register set from which address generator 50 operates.

As previously noted, the nine register sets of registers 22, 24, 26 and 28 include seven general purpose register sets and two special purpose register sets. Registers of sets 1-7 are thus provided to both read and write address generators 16 and 18a, 18b and are identified as register sets 1-7. Register sets 0 and 8, however are interconnected as register set 0 of read address generators 18a and 18b; and register 0 of write generator 16, respectively, and act as RPA and WPC registers 24. Thus, access to register set 0 will access one set of address registers at address generators 18a and 18b; and another register set at write address generator 16.

Address generator 50 further includes a shift register/multiplier 58 and two ten-bit adders 62 and 64. Multiplier 58 takes as input the output of data selector 52 and an offset input, to calculate an output OFF=offset*RS$_x$. The offset is formed as either a displacement value provided in bits [3:0] of the addressing instruction generated by instruction decoder 15, or as this displacement value plus the contents of loop index register 36, as calculated by adder 76. Whether or not the offset is formed as the displacement, or as the displacement+loop index depends on a bit within a selected mode register for the register set, as selected by selector 55. The ten-bit output of multiplier 58, OFF, is provided to a first ten-bit input of adder 64. Adder 62 further receives the ten-bit output of selector 54.

Modulo calculator 66 may further reduce the calculated addresses to modulo a FIFODEPTH (as stored in registers 48, 49) values for streaming access to memories A and C 12, 14 as detailed below.

Adder 62 calculates a subsequent address to be loaded into the indexed pointer register 24 by post incrementing the current value of pointer register 24 with an eight-bit value derived from increment register 22, provided at the inputs of adder 62. The eight-bit value is derived by block 60, by shifting left the value of "1" the number of times contained in bits [2:0] of the increment register 20, of the selected register set. A second modulo calculator 68 may reduce the calculated next address modulo FIFODEPTH for streaming access, as detailed below. Bit [7] of the address instruction, ADR_OP [7], may control if the pointer is, or is not, post incremented. If bit [7] of ADR_OP=1, the calculated next address is fed back to the indexed pointer register 24, by way of data selector 70. Of course, whether or not post increment is performed could be controlled by a register, such as the mode register of the selected register set.

As should now be apparent, each read address generator 18a, 18b and write address generator 16 form effective memory addresses of the form:

$$EA=RP_x+\text{offset}*RS_x,$$

Where the values of the pointers registers and scale registers RPx and RSx have been pre-loaded; and the offset is of the form $$\text{offset}=\text{displacement}+\text{loopindex}$$

where displacement forms part of the processor instruction, and the loopindex is maintained in loopindex register 36.

Figure 4:
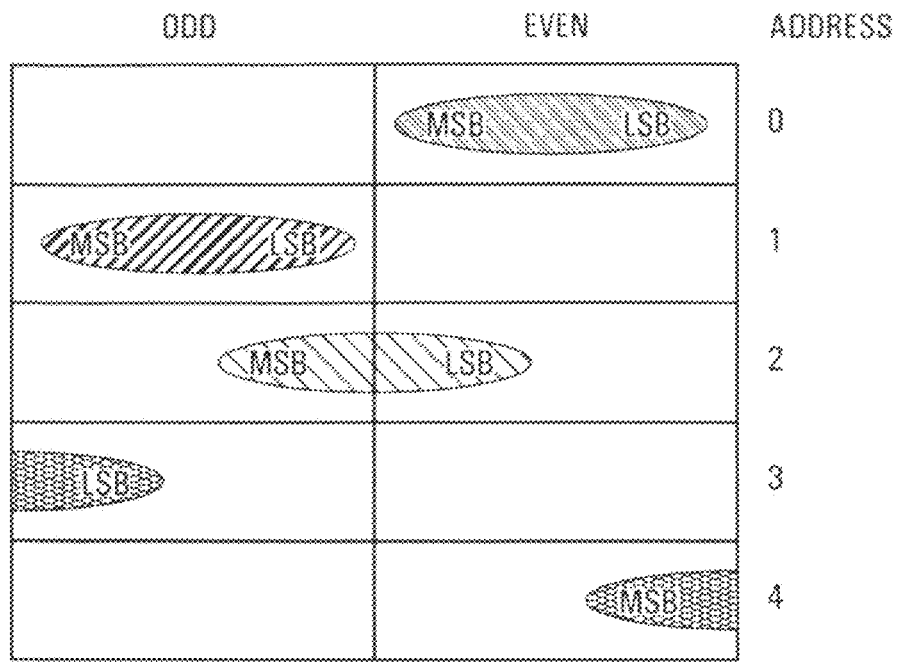
FIG. 4 schematically illustrates odd and even memory access by the processor of FIG. 1.

As noted, data to be addressed need not begin on a conventional memory unit boundary. In the depicted embodiment, up to sixteen bytes of data may be accessed on one-byte address increments. As such, data to be accessed by way of the EA may be contained entirely within an even address of memory A or C 12, 14 (as exemplified at address 0 of FIG. 4); entirely within an odd address of memory A or C 12, 14 (as exemplified at address 1 of FIG. 4); or contained in even and odd addresses of memory A or C 12, 14 (as exemplified at address 2, or addresses 3 and 4 of FIG. 4). If the data is contained even and odd addresses, the lower address data may be contained in either the even or odd memory bank. If the lower address data is in the even memory bank, even and odd addresses are the same (address 2, FIG. 4). If the lower address data is in the odd bank, the even address is one greater than the odd address (address 3 and 4, FIG. 4). Adder 72 and selector 74 accordingly selectively increment the generated effective address depending on the state of bit [4] of the effective address EA, to generate an even effective address EA_EVEN. The odd effective address EA_ODD is formed as the effective address EA.

In the depicted embodiment, the three address generators 16, 18a and 18b generate, respectively, addresses WA (WA_EVEN, WA_ODD); RA1 (RA_EVEN, RA_ODD) and RA2 (RA_EVEN, RA_ODD).

Figure 5:
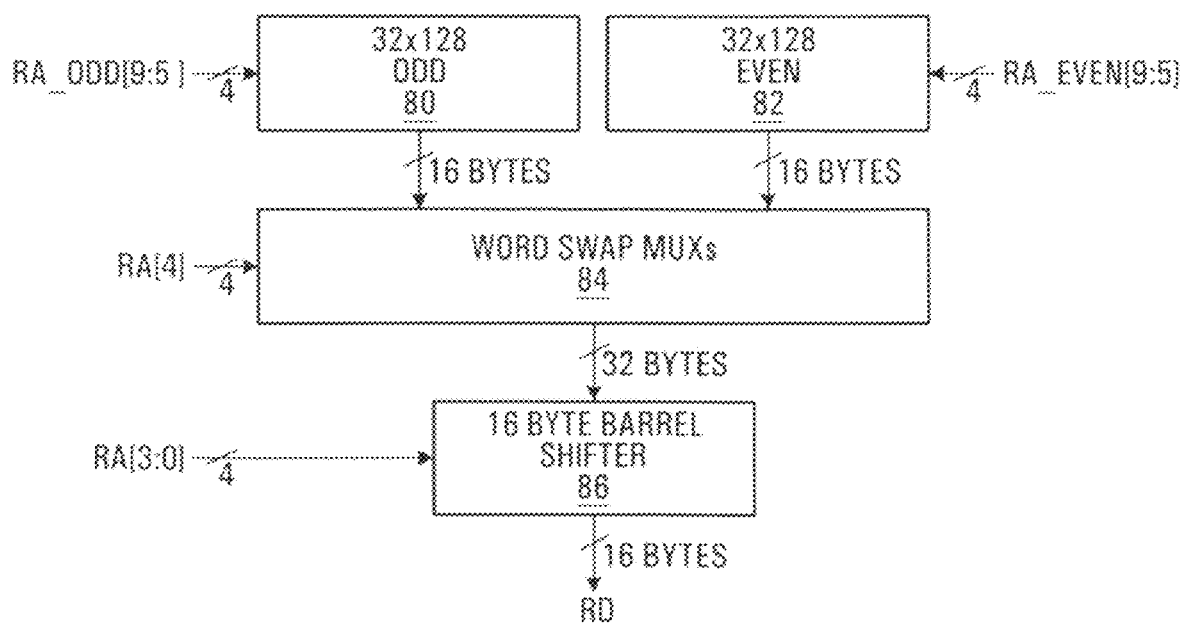
FIG. 5 is a simplified schematic block diagram of read byte alignment logic of memory of the processor of FIG. 1.

Read alignment logic, interconnecting each read address generator 18a and 18b (formed as address generator 50—FIG. 3) to memory A 14 is illustrated in FIG. 5. For illustration each effective address EA used as a read address is referred as the RA. As noted, each bank of memory is preferably formed of two 32×128-bit banks. Each bank thus has a five-bit address space and stores 32 data units of 128-bit data. As illustrated, bits [9:5] of the calculated effective addresses EA_EVEN and EA_ODD are provided to the address lines of the even and odd banks of memory, respectively. Bits [3:0] of the effective address (RA) are provided to barrel shifter 86. Bit [4] of the effective address (RA) is provided to multiplexer 84. Multiplexer 84 receives the 128 bit data unit (16 bytes) from each of odd and even memory banks 80, 82, at the memory bank address identified by bits [9:5]. Multiplexer 84 combines the two sixteen-byte data units into a 32-byte data unit, in dependence on bit [4] of the end address. If bit [4] of the effective address (RA) is a one, multiplexer reverses the order of the two sixteen-bit data units, taking the left most 16 bytes from the even bank 82, and the right most 16 bytes from the odd bank 80. In this way, the 16 bytes of addressed data are arranged sequentially from highest address to lowest address in the 32 bytes exiting multiplexer 84. Barrel shifter 86 shifts right the 32 bytes of data by the number of bytes specified in bits [3:0] of the effective address RA, and outputs the 16 rightmost shifted bytes. As a result, sixteen bytes of data beginning on a boundary that is not an integer multiple of the memory unit size (i.e. an unaligned boundary) may be read.

Figure 6:
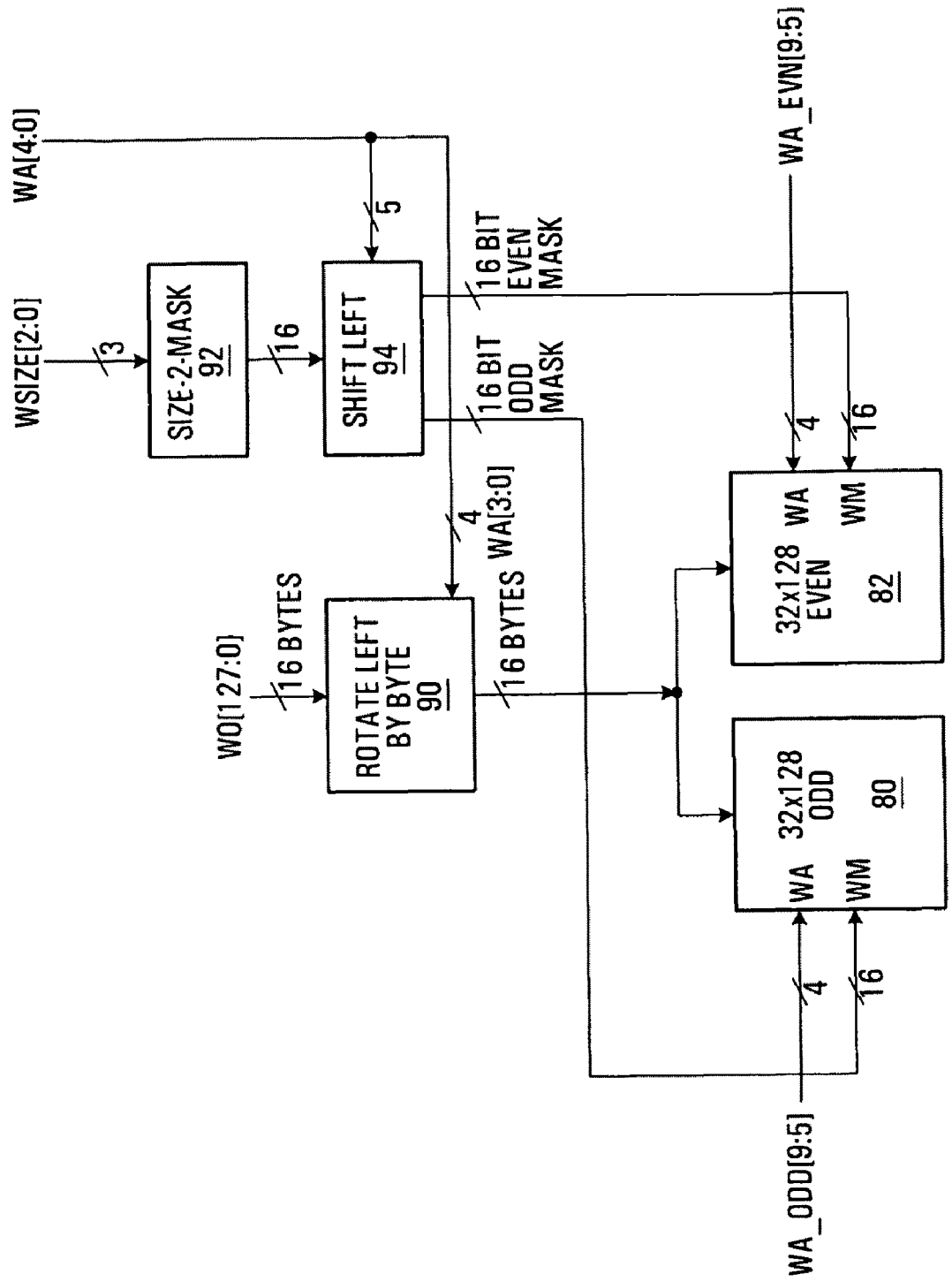
FIG. 6 is a simplified schematic block diagram of write byte alignment logic of memory of the processor of FIG. 1.
Figure 7:
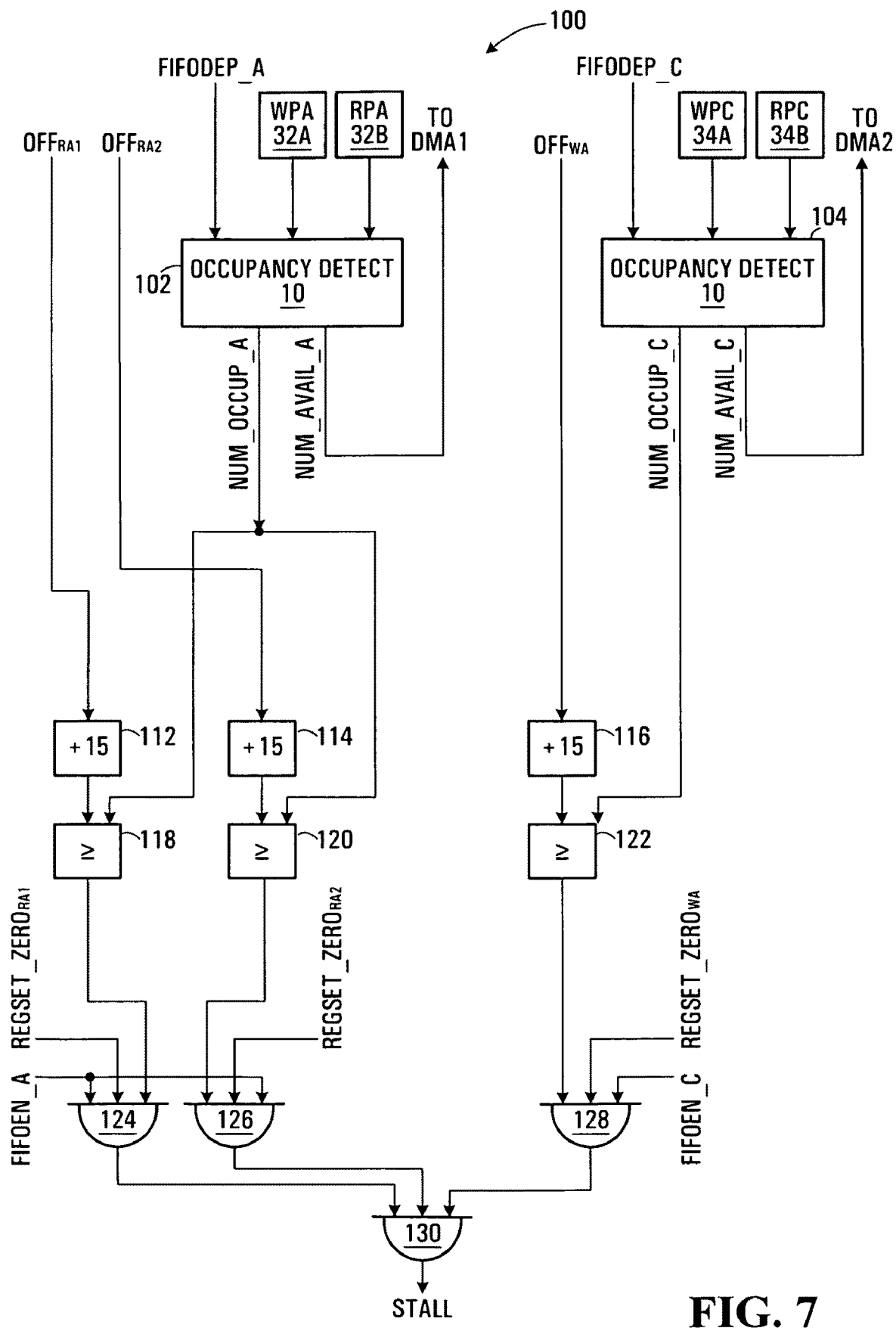
FIG. 7 is a simplified schematic block diagram of a stream interlock block, of the processor of FIG. 1.

Write alignment logic of memory A 12 (or memory C 14) is illustrated in FIG. 6. The effective write address is provided by a write address generator 16 having the form of address generator 50 (FIG. 2). For illustration each effective address EA used as a write address is referred to as a WA. As illustrated, bits [3:0] of the calculated effective address WA are provided to a barrel shifter 90. Barrel shifter 90 further receives a 16-byte data unit to be written from ALU 30 (FIG. 1). Shifter 90 rotates left the 16-byte data unit by the number of bytes specified in bits [3:0] of the write address, to provide a sixteen-byte output. Bytes of the sixteen-byte output are thus aligned with bytes in a 128-byte data unit to which they are destined. Bit masks are calculated depending on the size of the resulting data. A three-bit indicator of the data size in bytes is provided by decoder 15 to combinational block 92, which in turn outputs a sixteen-bit mask, having one bit for each byte specified by the data size WSIZE. WSIZE conveys sizes of 1, 2, 4, 8 and 16 bytes. These bits are provided to shift register 94 and shifted a number of bits corresponding to bits [4:0] of the write address (WA) to produce a thirty-two-bit output. The resulting thirty-two-bit output includes a bit mask having a "1" in each bit corresponding to a byte to which data is to be written. The sixteen most significant of the thirty-two bits are provided to mask inputs of odd memory bank 80; the sixteen least significant are provided to mask inputs of even memory bank 82. Each bit signifies whether or not the corresponding byte in the 128 bit data unit identified should be written to (1=write; 0=mask). As a result, anywhere between 0 and 16 bytes may be written to memory A 12, and such data may be written on a non-convention (i.e. non 128-bit) boundary.

Memory C 14 may be written to in the same way as memory A 12, and therefore includes write alignment logic. Which one of memories A and C 12, 14 is written to by ALU 30 may be controlled by a status bit of the mode register of the selected register set. As noted, memory C cannot be read by ALU 30, and therefore need not include read logic of FIG. 5.

In operation, processor 10 (FIG. 1) fetches a current instruction from instruction memory 40 and decodes it at decoder 15 to form three addressing instructions and a write size indicator WSIZE. One of the three resulting addressing instructions is provided to each of address generators 16, 18*a* and 18*b*. This accordingly causes each of the address generators 16, 18*a* and 18*b* to retrieve pointer values within an identified pointer set.

Using the retrieved registers each of address generators 16, 18*a* and 18*b* respectively form $$WA = EA = RP_{x1} + \text{offset}_1 * RS_{x1}$$

$$RA_1 = EA = RP_{x2} + \text{offset}_2 * RS_{x2}$$

$$RA_2 = EA = RP_{x3} + \text{offset}_3 * RS_{x3}$$

As noted, each of the offsets may equal a displacement value, or value equal to displacement+loopindex.

Optionally, if bit [7] of the reading or writing address op-code is set, the pointer register RP 24 of the associated register set is updated by incrementing the pointer register RP 24 of set based on a value contained in the increment register RI 22 for that set. The pointer register RP 24 may be incremented at the end of a current clock cycle, after the previous value of the pointer register RP 24 has been used to calculate the current effective address.

All three addresses are formed concurrently, and provided to memory A 12. In the depicted embodiment the three addresses are formed in the same clock cycle. Write address WA may similarly be provided to memory C 14. In one or more subsequent clock cycles, ALU 30 may fetch the contents of memory locations $RA_1$ and $RA_2$, and may perform an arithmetic or logical operation in accordance with the op-code contained in bits [31:24] of the current instruction. In the disclosed embodiment, processor 10 is a SIMD processor. Thus, the arithmetic or logical operation may be applied to different portions of the retrieved data identically. Again, the add instruction exemplified above generates a 128-bit result from the 8-way parallel adds of two 16-bit operands; another add instruction may produce a 32-bit result summing 8, 16-bit operands, into a 32-bit result. Other SIMD instructions that may be embodied in ALU 30 will be known to those of ordinary skill. The results are provided to the write alignment logic of memory A 12 (or memory C 14), and written to memory 12, on the possibly unaligned memory address specified by WA.

Upon completion of the current instruction, a further instruction is fetched from memory 40 and executed. Branch unit 19 increments the program counter in a conventional manner. Additionally, processor 10 may support zero-overhead looping, as understood by a person of ordinary skill. That is, instructions within memory 40 may identify segments within memory 40 containing instructions that are to be repeatedly executed, in a loop, by branch unit 19. At the same time, branch unit 19 may increment the loopindex register 36 for each iteration of the defined loop.

If the value in loopindex register 36 is added to the displacement, the calculated addresses are incremented by the value of loopindex*$RS_x$ for each iteration of a loop being executed by processor 10, without incrementing the pointer register. This is particularly convenient for accessing locations of memory A, C 12 or 14 at defined intervals. For example, elements in a column within a stored two dimensional array may be so accessed.

In an additional streaming mode of operation, processor 10 processes streams provided by DMA engine 42. More specifically, a stream of data provided by DMA engine 42 is received within memory A 12; processed by ALU 30; and written to memory C 14. From memory C 14, the data may be read by DMA engine 44.

To this end, an area within memories A and C 12 and 14 may be defined as a FIFO buffer. The depth of the FIFO buffer (FIFODEPTH) may be defined in three bits of the FIFODEP_A register 48 (or FIFODEP_C register 49 for memory C). That is, a FIFO of $2^{FIFODEP\_A}$ (or $2^{FIFODEP\_C}$)

memory units is thus defined in memory A (or memory C). For simplicity, the defined FIFO begins at address 0 of the memory. Further, operation of the FIFO may be controlled by a one bit FIFOEN_A register 46 (or FIFOEN_C register 47 for memory C). This status bit enables modulo calculators 66 and 68 (FIG. 3) of read and write address generators 16, 18a and 18b. If enabled, addresses calculated by address generators 16, 18a and 18b are reduced by the modulus specified by the FIFODEP_A value of the register 48 by modulo calculator 66 (FIG. 3).

Streams are written to memory A 12 by DMA engine 42. As the stream is written, the WPA register 32a is incremented (FIG. 1, 7) by DMA engine 42. As the stream is read by ALU 30, the RPA register 24 is incremented. Similarly, streams are read from memory C 14 by DMA engine 44. Data is written to the FIFO of memory C by ALU 30. Register RPC 32b is updated by DMA engine 44; register WPC 24 is updated as a result of writes by ALU 30.

As such, the number of addresses occupied by the FIFO in memory A 12 equals the difference of RPA register 24 and register WPA 32a. If WPA≧RPA, the number of occupied addresses of the FIFO in memory A 12 (NUM_OCCUP_A) equals WPA-RPA. Otherwise the number of addresses occupied may be calculated as WPA−RPA+FIFODEP_A. The number of addresses occupied in the FIFO of memory C 14 (NUM_OCCUP_C) may similarly be calculated.

Now, interlock block 100, generates a stall signal any time ALU 30 attempts to read from a location not yet occupied with data (i.e. not yet written to by DMA engine 42) of the FIFO of memory A 12. Similarly, interlock block 100 generates a stall signal each time ALU 30 attempts to write to a location currently occupied in FIFO of memory C 14 (i.e. not yet read by DMA engine 44).

To this end block 100, includes combinational logic block 102 that calculates the number of addresses occupied and available in the FIFO of memory A 12 by calculating NUM_OCCUP_A=WPA_RPA or WPA−RPA+FIFODEP_A, and NUM_AVAIL_A=FIFODEP_A−NUM_OCCUP_A. If $OFF_{RA1}+15\geq$NUM_OCCUP_A as determined by summer 112 and comparator 118 the stall signal is generated. Similarly, if $OFF_{RA2}+15\geq$NUM_OCCUP_A as determined by summer 114 and comparator 120 the stall signal is generated.

Similarly, combinational logic block 104 calculates the number of addresses occupied and available in the FIFO of memory C 14 by calculating NUM_OCCUP_C and NUM_AVAIL_C=FIFODEP_NUM_OCCUP_C. If $OFF_{WA}$+15≧NUM_AVAIL_C as determined by summer 116 and comparator 122, the stall signal is generated.

As described, combinational logic blocks 102 and 104 provide indicators of the number of addresses unoccupied in the FIFO of memory A 12 (NUM_AVAIL_A) and the number of addresses occupied in the FIFO of memory C 14 (NUM_OCCUP_C). These are then respectively provided to DMA engines 42, 44, to control operation of when DMA engines are permitted to read and write, respectively.

Gates 124, 126, 128 ensure that stall signals are only generated when register set 0 is used to read or write to memories A or C 12, 14. The line carrying the stall signal is provided to ALU 30, instruction decoder 15, branch unit 19 (and optionally address generators 16, 18a and 18b). In the presence of the stall signal, ALU 30, decoder 15 and branch unit 19 do not transition states, effectively stalling the operation of processor 10 until DMA engine 42 has written to the FIFO of memory A 12 or DMA engine 44 has read from the FIFO of memory C 14. Once DMA engines 42, 44 have read or written to the FIFOs as required, the stall signal is released and the processor 10 may continue execution of the current and subsequent instructions.

Although the preferred embodiment has been described as a SIMD processor, a person of ordinary skill will readily appreciate that aspects of the invention may easily be embodied in conventional non-SIMD processors.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

What is claimed is:

1. A method of executing an instruction using a processor, said processor having a plurality of addressing register sets, each register set comprising a pointer register and a scale register, said method comprising calculating an effective memory address for use by said processor in executing said instruction, said calculating comprising:
    retrieving a pointer stored in said pointer register of one of said register sets;
    retrieving a scale value stored in said scale register of said one of said register sets; and
    forming an effective memory address from said scale value and said pointer, wherein said forming comprises multiplying said scale value by an offset value and summing said pointer and said scale value multiplied by said offset value, to form said effective memory address.

2. The method of claim 1, wherein said offset value comprises a part of a processor readable representation of said instruction.

3. The method of claim 1, wherein said offset value is stored in a third register of said processor.

4. The method of claim 1, wherein each of said register sets further comprises an increment register, and said method further comprises updating said pointer in said pointer register of said selected one of said register sets by a value stored in said increment register of said selected one of said register sets, after performing an arithmetic or logical operation specified by said instruction.

5. The method of claim 1, wherein said offset value comprises the sum of a displacement value and a loop value stored in a loop register maintained by said processor in response to executing a defined loop of instructions.

6. The method of claim 5, wherein said offset value is formed from said loop value in response to an indicator in a part of a processor readable representation of said instruction.

7. The method of claim 1, wherein said effective memory address is formed from said pointer register and said scale register of said selected one of said register sets in a single clock cycle of said processor.

8. The method of claim 1, further comprising retrieving data stored at said effective memory address for use as a source operand, and applying an arithmetic or logical operation specified by said instruction identically to portions of said source operand.

9. In a processor having at least two register sets, each of said register sets comprising a pointer register containing a memory address and an associated increment register, a method of executing an instruction comprising:
    retrieving data stored at a first operand memory address based on a pointer register of a first one of said sets, for use as a first operand, wherein said first operand memory address is generated by summing values in a scale register multiplied by a first offset value and a pointer register;

performing an arithmetic or logical operation in accordance with said instruction on said first operand to produce a result; and updating said pointer register of said first set by incrementing said pointer register of said first set based on a value contained in its associated increment register.

10. The method of claim 9, further comprising retrieving data stored at a memory address based on a pointer register of a second one of said sets, for use as a second operand; and performing said arithmetic or logical operation in accordance with said instruction on said first and second operand to produce said result.

11. The method of claim 10, further comprising updating said pointer register of said second set by incrementing said pointer register of said second set based on a value contained in its associated increment register.

12. The method of claim 10, wherein each of said first and second sets each further comprises an additional register and said memory address is further based on said register of one of said sets.

13. The method of claim 9, further comprising storing said result at an address defined at least in part by a pointer register of a third one of said sets.

14. The method of claim 9, further comprising applying said arithmetic or logical operation in accordance with said instruction identically to portions of said first operand.

15. A processor for connection with processor-readable memory, said processor comprising:
   first and second address generators for generating first and second operand memory addresses, respectively;
   first and second sets of registers, in communication with said first and second address generators, each of said first and second set of registers comprising a pointer register and a scale factor register;
   said first operand memory address generated by summing values in said scale register of said first set of registers multiplied by a first offset value and said pointer register of said first set of registers;
   said second operand memory addresses generated as summing values in said scale register of said second set of registers multiplied by a second offset value and said pointer register of said second set of registers; and
   an arithmetic logic unit in communication with memory for performing an operation specified by an instruction, on operands stored at said first and second operand memory addresses of said processor readable memory.

16. The processor of claim 15, wherein said first address generator generates a first even memory address and a first odd memory address, and wherein said processor readable memory is addressable in memory data units having a defined bit size, said processor further comprising a memory interface to obtain data at said first odd memory address having said defined bit size, and data at said first even memory address having said defined bit size; a combiner for combining said data stored in said first and second memory data units to form said data at said first operand memory address.

17. The processor of claim 16, further comprising:
   a third address generator;
   a third set of registers, in communication with said third address generator and comprising a pointer register and a scale factor register;
   said third address generator, for generating a write memory address for storing the results of said arithmetic or logical operation, by summing values in said scale factor register of said third set of registers multiplied by a third offset value and said pointer register of said third set of registers.

18. The processor of claim 17, wherein said arithmetic logic unit applies said operation specified by said instruction identically to portions of said operands stored at said first and second operand memory addresses of said processor readable memory.

19. The processor of claim 18, wherein said first set of registers further comprises an increment register used to post-increment said pointer register of said first set of registers by a value of said increment register of said first set of registers after said arithmetic logic unit has performed said arithmetic or logical operation.

20. The processor of claim 19, wherein said second set of registers further comprises an increment register, used to post increment said pointer register of said second set by a value of said increment register after said arithmetic logic unit has performed said arithmetic instruction.

21. The processor of claim 20, wherein said first set of registers comprises a mode register, and said mode register dictates if said pointer register of said first set of registers is post incremented.

22. The processor of claim 21, wherein said second set of registers comprises a mode register, and said mode register dictates if said pointer register of said second set of registers is post incremented.

23. The processor of claim 20, wherein said instruction includes at least one mode indicator indicating whether one of said pointer registers of one of said first and second sets of registers is post incremented.

24. The processor of claim 15, further comprising a loop index register, and said first operand address is generated by further summing thereto values in said loop index register multiplied by said scale factor register of said first set of registers.

25. A single instruction, multiple data (SIMD) processor comprising a memory interface for accessing memory addressable in data units of a defined bit size, said memory interface comprising:
   an address generator for generating first and second operand addresses of memory to be read, said first operand memory address generated by summing values in a scale register multiplied by a first offset value and a pointer register;
   a memory interconnect to obtain data units at said first operand address having said defined bit size, and at said second operand address having said defined bit size; and
   a combiner for combining said data units from said first and second operand memory addresses to form an operand spanning said first and second memory addresses.

26. The processor of claim 25, wherein said first and second addresses are adjacent even and odd addresses.

27. The processor of claim 26, wherein said address generator generates said addresses concurrently.

28. In a processing system comprising a processor and memory, wherein said memory is addressable by said processor in memory data units having a defined bit size, a method of retrieving a source data unit spanning first and second ones of said memory data units, said method comprising:
   simultaneously addressing said memory to access said first and second ones of said memory data units;
   retrieving data stored in said first and second ones of said memory data units; and
   combining said data stored in said first and second memory data units to form said source data unit.

29. The method of claim 28, wherein said source data unit has a bit size smaller than said defined bit size.

30. The method of claim 29, wherein said simultaneously addressing comprises addressing even and odd banks of said memory, to access said first and second ones of said memory data units, respectively.

31. The method of claim 29, wherein said simultaneously addressing comprises addressing dual ported memory.

32. The method of claim 31, wherein said combining comprises shifting said retrieved data by a selected number of bits in dependence on said defined bit size.

33. The method of claim 31, further comprising reversing an order of said first and second ones of said memory data units, prior to said retrieve.

34. In a processing system comprising a single instruction, multiple data (SIMD) processor and memory, wherein said memory is addressable by said processor in memory data units having a defined bit size, a method of storing a resulting data unit spanning first and second ones of said memory data units, said method comprising:
  splitting said resulting data unit into first and second data portions; said first data portion to be stored in said first of said memory data units; said second data portion to be stored in said second of said memory data units;
  generating a first masking instruction to cause a memory element storing said first data unit to mask writing to said data unit at bits not occupied by said first data portion;
  generating a second masking instruction to cause a memory element storing said second data unit to mask writing to said data unit at bits not occupied by said second data portion;
  providing said first and second masking instructions to memory storing said first and second data units; and
  storing said first data portion into the portion of said first memory data unit according to said first masking instruction and concurrently storing said second data portion at a portion of said second memory data unit according to said second masking instruction.

35. The method of claim 34, wherein said first and second data portions have an equal bit size.

36. A method of operating a processor executing sequential instructions, comprising: receiving a stream of data;
  buffering a portion of said stream, in a first-in, first-out buffer within memory of said processor;
  reading data from said first-in-first out buffer, by said processor;
  encountering an instruction to read data in said stream not yet received in said buffer; and
  stalling current execution of said instruction and further ones of said sequential instructions until said data within said stream specified by said instruction has been received in said first-in, first-out buffer.

37. The method of claim 36, wherein said stream is received from a direct memory access (DMA) engine.

38. The method of claim 37, wherein said reading further comprises calculating a read address, and said stalling further comprises comparing said read address to addresses occupied by said first-in, first-out buffer.

39. A processor that executes instructions stored in instruction memory, said processor comprising:
  memory defining a first-in, first-out buffer for buffering a portion of a data stream;
  an arithmetic or logic unit (ALU), for processing data within said memory;
  an address generator for generating a memory address of said memory to be read by said ALU; and
  an interlock, operable to generate a stall signal to stall execution of a currently executing instruction in said instruction memory in response to generating an address to access data in said buffer, not yet containing data in said stream.

40. The processor of claim 39, further comprising interconnects for interconnecting said processor to a DMA engine that may access said buffer to write said stream.

41. A processor that executes instruction stored in instruction memory, said processor comprising:
  memory defining a first-in, first-out buffer for buffering a portion of a data stream, to be read in a stream by a device other than said processor;
  an arithmetic or logic unit (ALU), for processing data within said memory;
  an address generator for generating a memory address of said memory to be written to by said ALU; and
  an interlock, operable to generate a halt signal to halt execution of a currently executing instruction in said instruction memory in response to said address generator generating an address to write to an address in said first-in, first-out buffer containing data, not yet read by said other device.

42. A method of operating a processor executing sequential instructions, comprising:
  buffering a portion of a stream of data to be written, in a first-in, first-out buffer within memory of said processor;
  providing data from said first-in, first-out buffer to a device other than said processor;
  writing data to said first-in-first out buffer, by said processor; encountering an instruction to write data to said first-in, first out buffer at addresses containing data not yet provided from said first-in, first-out buffer; and
  stalling current execution of said instruction and further ones of said sequential instructions until said data within said first-in, first-out buffer specified by said instruction has been provided from said first-in, first-out buffer.

43. The method of claim 42, wherein said stream is provided to a direct memory access (DMA) engine.

44. The method of claim 43, wherein said writing further comprises calculating a write address, and said stalling further comprises comparing said write address to addresses occupied by said first-in, first-out buffer.

45. A method of executing an instruction in a processor having at least two register sets, each of the register sets comprising a pointer register containing a memory address and an associated increment register, comprising:
  retrieving data stored at an operand memory address based on a pointer register of one of the sets for use as an operand, wherein the operand memory address is generated by summing values in a scale register multiplied by an offset value and a pointer register;
  performing an operation in accordance with the instruction on the operand to produce a result; and
  updating the pointer register of the first set by incrementing the pointer register of the one of the sets based on a value contained in its associated increment register.

* * * * *